(12) United States Patent
Cedergren et al.

(10) Patent No.: US 6,773,660 B2
(45) Date of Patent: Aug. 10, 2004

(54) FERRITIC STAINLESS STEEL FOR USE IN HIGH TEMPERATURE APPLICATIONS

(75) Inventors: Magnus Cedergren, Sandviken (SE); Kenneth Göransson, Sandviken (SE)

(73) Assignee: Sandvik AB, Sandviken (SE)

(*) Notice: Subject to any disclaimer, the term of this patent is extended or adjusted under 35 U.S.C. 154(b) by 0 days.

(21) Appl. No.: 10/261,416

(22) Filed: Oct. 2, 2002

(65) Prior Publication Data
US 2003/0086809 A1 May 8, 2003

(30) Foreign Application Priority Data
Oct. 2, 2001 (SE) ............................... 0103310

(51) Int. Cl.$^7$ ................. C22C 38/22; C22C 38/40; C22C 38/44
(52) U.S. Cl. ................. 420/43; 420/50; 420/52
(58) Field of Search ............... 420/43, 50, 52, 420/40, 53, 56, 57

(56) References Cited

U.S. PATENT DOCUMENTS

| | | | |
|---|---|---|---|
| 3,992,161 A | | 11/1976 | Cairns et al. |
| 4,414,023 A | | 11/1983 | Aggen et al. |
| 4,686,155 A | * | 8/1987 | Kilbane et al. ............. 428/653 |
| 4,859,649 A | | 8/1989 | Böhnke et al. |
| 5,130,085 A | | 7/1992 | Tendo et al. |
| 5,866,065 A | | 2/1999 | Herbelin et al. |
| 6,197,132 B1 | | 3/2001 | Andersson-Drugge |

| | | |
|---|---|---|
| 2002/0124913 A1 | 9/2002 | Uehara et al. |

FOREIGN PATENT DOCUMENTS

| | | |
|---|---|---|
| EP | 0 646 657 | 4/1995 |
| EP | 0 667 400 | 8/1995 |

* cited by examiner

Primary Examiner—Daniel Jenkins
(74) Attorney, Agent, or Firm—Burns, Doane, Swecker & Mathis, L.L.P.

(57) ABSTRACT

A hot workable ferric stainless steel alloy resistant to thermal cyclic stress and oxidation at elevated temperatures having improved mechanical properties rendering it especially suitable as a substrate for exhaust gas purifying applications, such as catalytic converters or heating applications, has a composition including (in weight-%):

| | |
|---|---|
| C | ≤0.05%; |
| Cr | 16.0–24.0%; |
| Ni | more than 1.0–15.0%; |
| Al | 4.5–12.0%; |
| Mo + W | ≤4.0%; |
| Mn | ≤1.0%; |
| Si | ≤2.0%; |
| Zr + Hf | ≤0.1%; |
| REM | ≤0.1%; |
| N | ≤0.05%; | and
balance Fe and normally occurring steelmaking impurities and additions.

15 Claims, 7 Drawing Sheets

FERRITIC STAINLESS STEEL FOR USE IN HIGH TEMPERATURE APPLICATIONS

FIELD OF THE INVENTION

The present invention relates to a hot workable ferritic stainless steel alloy resistant to thermal cyclic stress and oxidation at elevated temperatures and having improved mechanical properties for use as substrate in exhaust gas purification applications, such as catalytic converters and heating applications.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Thin foils of ferritic Fe—Cr—Al alloys are today used as carrier materials for catalytic converters in the purification of exhaust gases from internal combustion engines. The biggest advantage of such an alloy lies in the formation of a thin, adherent aluminium oxide film on the surface. The surface oxide film protects the metal from rapid oxidation at the temperature at which the catalytic converter is used, and at cyclic thermal stress which are the usual working conditions in this application. In order to form such a protective oxide a minimum content of 4.5% aluminium in the alloy is assumed to be necessary.

The protective properties of this aluminium oxide are known to be improved, especially with respect to thermal cycling, if the alloy contains small amounts of one or more or the so called reactive elements (RE), such as Mg, Ca, Zr, Hf or rare earth elements (REM), such as Sc, Y or one of the lanthanide elements.

Such alloys can be produced conventionally by melting, refining, casting, billet rolling or forging followed by hot and cold rolling to produce thin strips with a final thickness of less than 150 μm. The alloys can also be produced by using a pre-rolled strip with a lower aluminium content than the desired catalytic converter carrier material and subsequently depositing a layer of an aluminium rich alloy on the surface of this material. The deposition can be made in many different ways, e.g. by dipping the strip in a molten Al alloy, or by roll bonding (cladding) an Al alloy on top of a ferritic steel. A suitable method for coating by means of PVD-technology is described in U.S. Pat. No. 6,197,132, which is hereby incorporated by reference. This process can be used in order to deposit the Al rich alloy. In all these examples, the thickness of the strip with the deposit may be the final thickness, or the strip may be rolled down to a smaller thickness after the deposition has been performed. The composite of ferritic alloy and aluminium alloy may be heat treated to provide a homogeneous alloy, or an alloy with an increasing aluminium concentration towards the surface.

The mechanical properties of ferritic Fe—Cr—Al alloys, especially with increasing content of Al, are known to be poor at high temperature. Several ways of improving these properties are known, such as the production of fine dispersions of oxide or nitride phases by powder metallurgical processes. These processes involve expensive operations during production and are hence not suitable for the manufacturing of alloys that are to be produced in large quantities.

Another way of increasing the high temperature strength is by precipitating minute particles of nickel aluminides. This has been described for a number of Fe—Ni—Cr—Al alloys with a basically ferritic structure or a mixed austenitic/ferritic structure.

However, such alloys are in present-day situations only known to be provided in hot rolled or cast conditions. If the alloys are to be used in catalytic converters, it must be possible to form the alloys by cold rolling down to a final thickness of less than approximately 100 μm.

It is known to be possible to produce Fe—Ni—Cr—Al alloys with a basically austenitic structure. The nickel content of such alloys should exceed 30 weight-%, which makes the raw material very expensive. The oxidation properties of such alloys are in general poorer than those of ferritic alloys.

It is known that the addition of approximately 10 weight-% nickel to a Fe—Cr—Al alloy furthermore improves the resistance to thermal shock, a phenomenon that is known to cause a reduction in the useful lifetime in the application of catalytic converters.

The future trend for metallic catalytic converter steel foils goes towards reduced thicknesses. This leads to several problems. One problem is the need of better oxidation properties because of less available aluminium per surface area unit. Another problem is that a material with increased high temperature fatigue strength will be needed.

SUMMARY OF THE INVENTION

It is therefore an object of the present invention to provide an alloy with increased oxidation resistance, resistance to cyclic thermal stress and improved mechanical properties such as increased high temperature fatigue strength for use as substrate in exhaust gas purifying applications, such as catalytic converters in combustion engines.

Another object of the present invention is to provide improved production process routes for a ferritic Fe—Ni—Cr—Al alloy.

A further object of the present invention is to provide an alloy for use in heating applications.

According to one aspect, the present invention is directed to a ferritic stainless steel alloy resistant to thermal cyclic stress and oxidation at elevated temperatures having a composition comprising (in weight-%):

| | |
|---|---|
| C | ≦0.05%; |
| Cr | 16.0–24.0%; |
| Ni | more than 1.0–15.0%; |
| Al | 4.5–12.0%; |
| Mo + W | ≦4.0%; |
| Mn | ≦1.0%; |
| Si | ≦2.0%; |
| Zr + Hf | ≦0.1%; |
| REM | ≦0.1%; |
| N | ≦0.05%; | and
balance Fe and normally occurring steelmaking impurities and additions.

According to another aspect, the present invention provides a foil formed from a ferritic stainless steel alloy as set forth above the foil having a thickness of less than 150 μm.

According to another aspect, the present invention provides a heat treating furnace comprising a component formed from the alloy as described above.

According to yet another aspect, the present invention provides a catalytic converter comprising a component formed from the alloy as described above.

According to a further aspect, the present invention provides a catalytic converter comprising a component formed from the foil as described above.

According to an additional aspect, the present invention provides a method of producing a foil of an alloy having a composition as set forth above, the method comprising coating a substrate material with pure aluminium and/or an aluminium-base alloy by dipping, cladding or PVD.

DETAILED DESCRIPTION OF THE INVENTION

Figure 1:
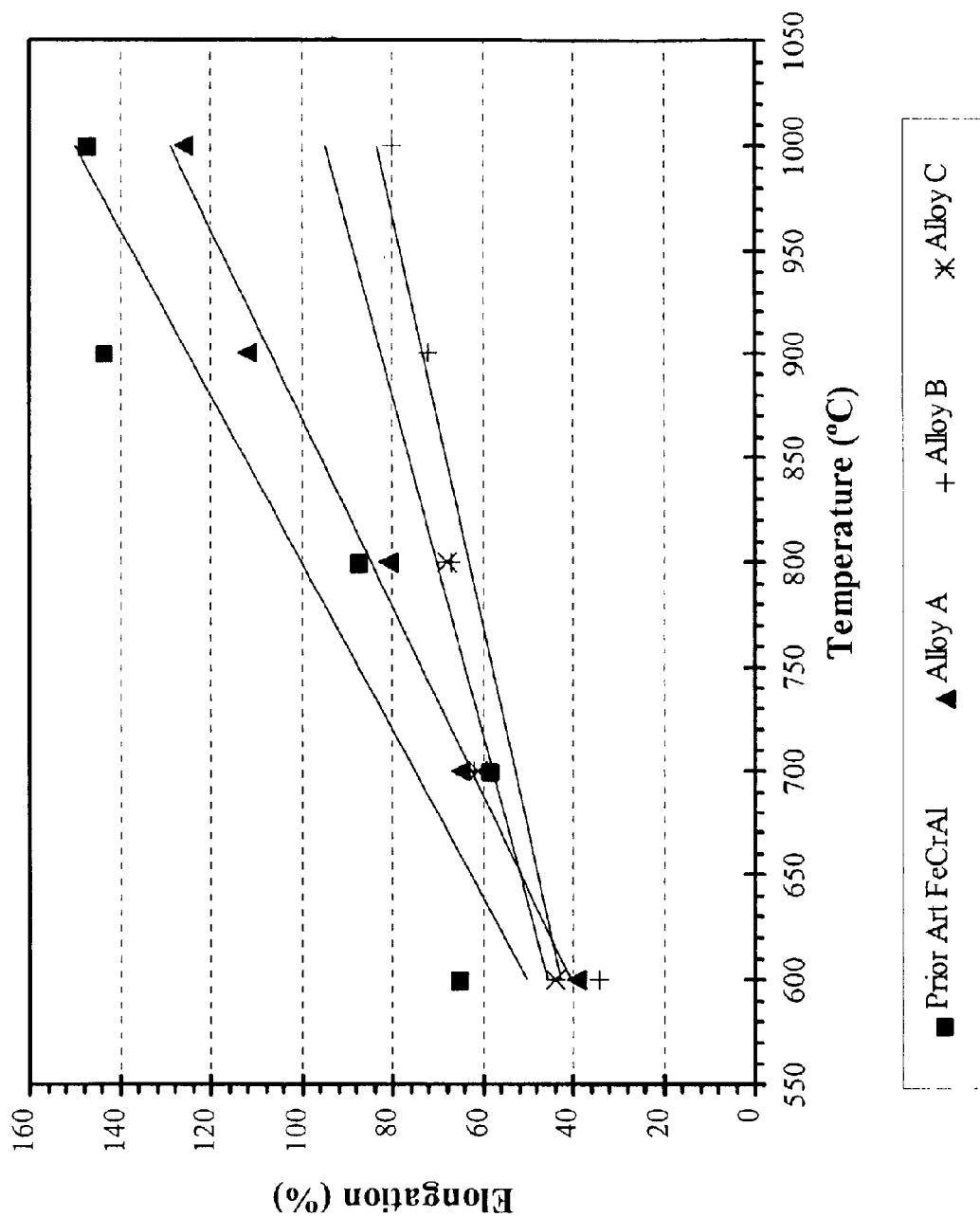
FIG. 1 shows the elongation to fracture for alloys according to the present invention compared with one Prior Art FeCrAl-alloy sample plotted vs. temperature.
Figure 2:
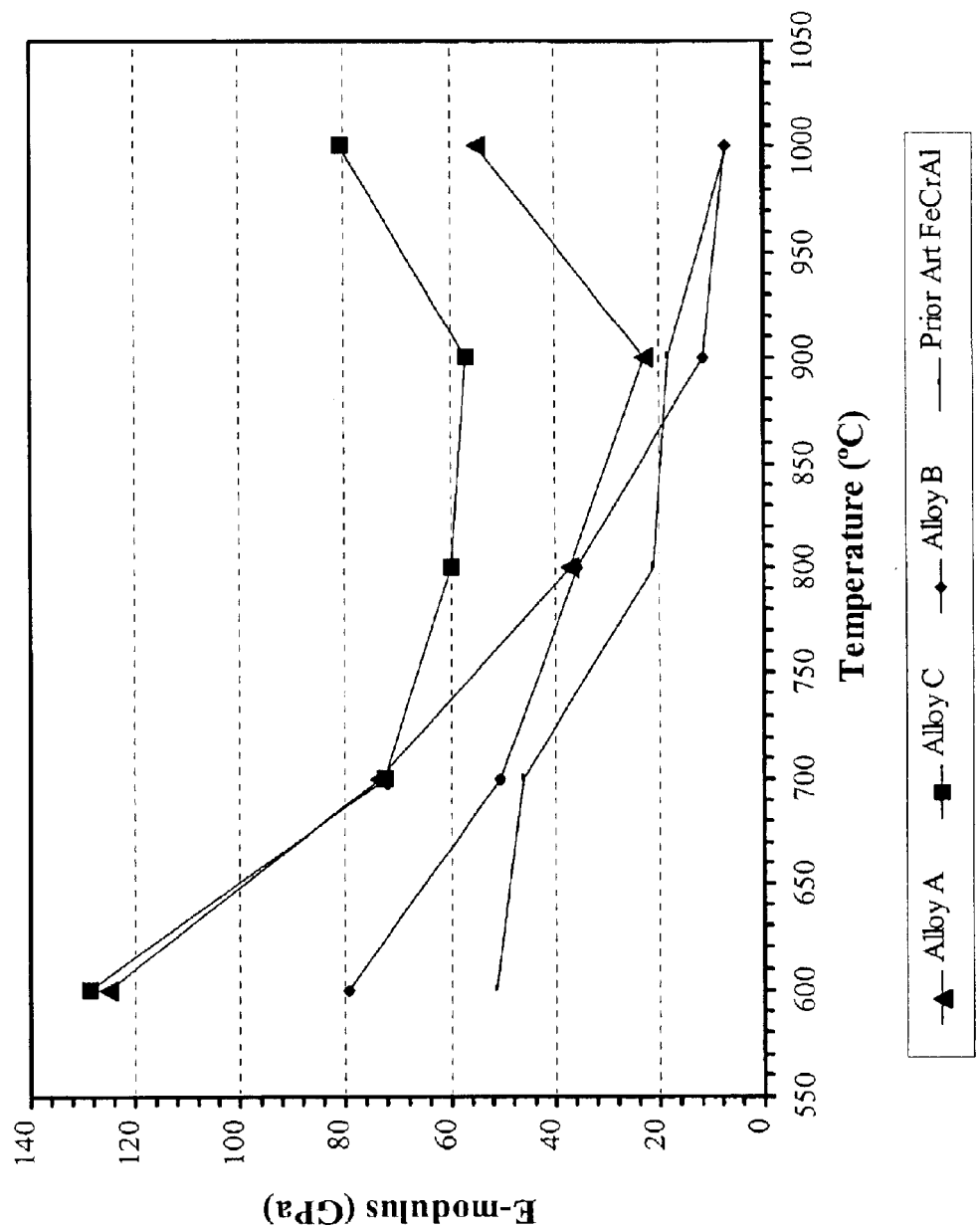
FIG. 2 shows the Young's modulus plotted vs. temperature for the same samples as in FIG. 1.
Figure 3:
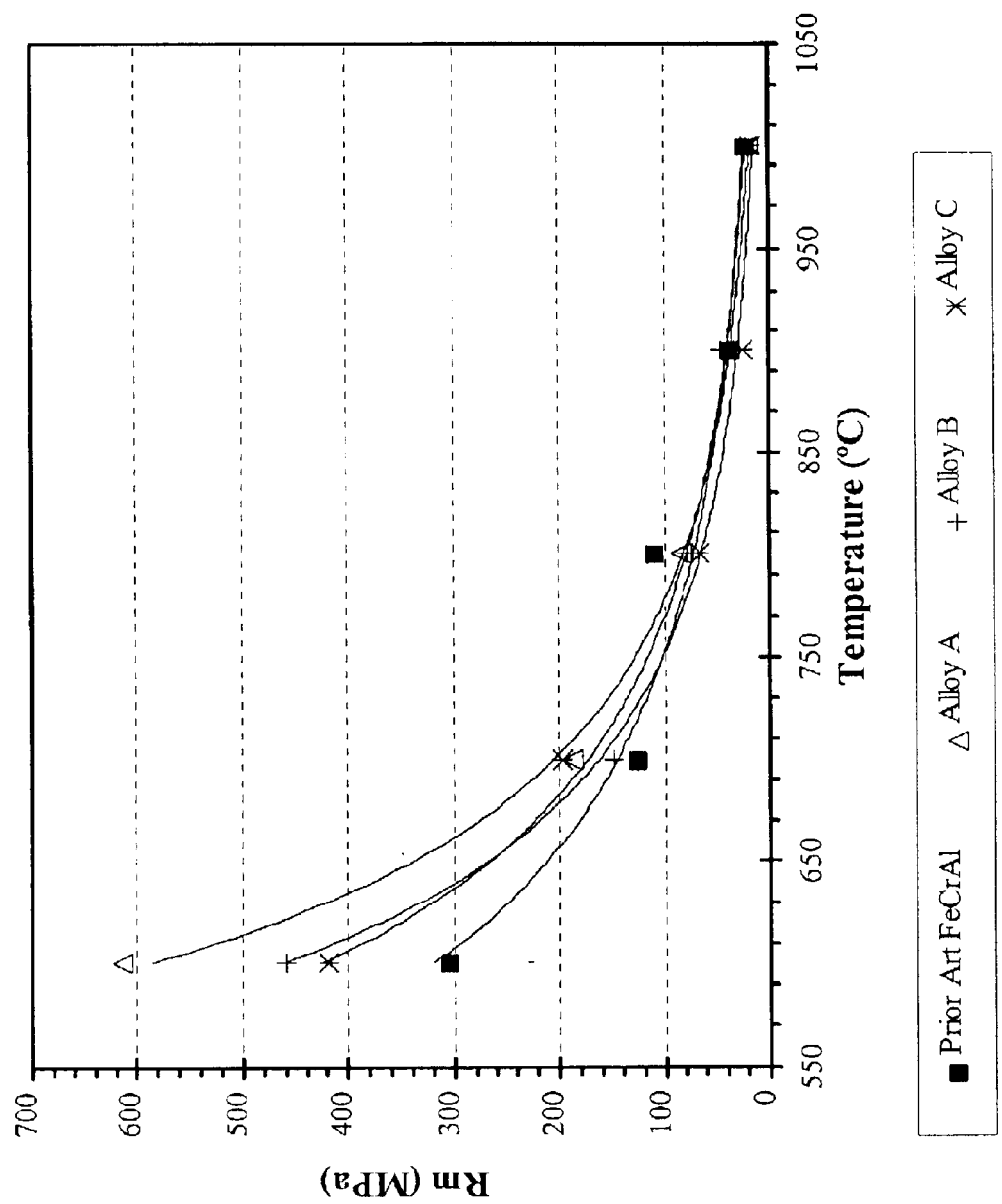
FIG. 3 shows the tensile strength plotted vs. temperature for the same samples as in the preceding figures.
Figure 4:
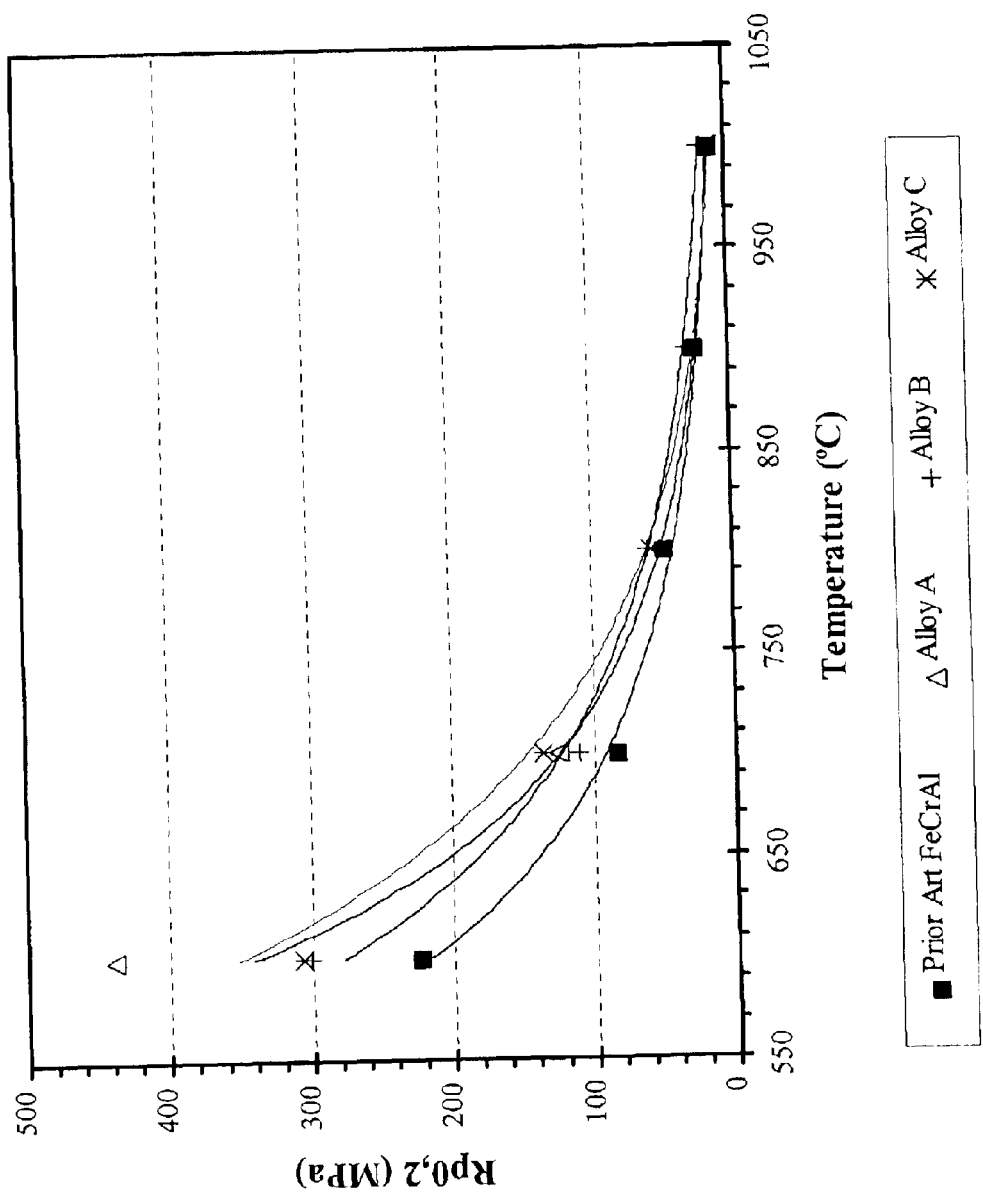
FIG. 4 shows the yield strength plotted vs. temperature for the same samples as in the preceding figures.

For illustrative but non-limiting purposes, the invention will now be described in more detail with reference to the appended figures.

According to a preferred aspect of the present invention, an alloy is provided with a composition as follows (all contents in weight-%):

| C | ≦0.05 |
|---|---|
| Cr | 16.0–24.0% |
| Ni | more than 1.0–15.0% |
| Al | 4.5–12.0; |
| Mo + W | ≦4.0% |
| Mn | ≦1.0% |
| Si | ≦2.0% |
| Zr + Hf | ≦0.1% |
| REM | ≦0.1% |
| N | ≦0.05% | balance Fe and normally occurring steelmaking impurities and additions.

The content of Cr should be limited to 16.0 to 24.0 wt-%, preferably to 20.0 to 22.0 wt-%. The content of Ni should be limited to more than 1.0 to 15.0 wt-%, preferably to 2.5 to 15.0 wt-%, most preferably to 5.0 to 12.5 wt-%.

The content of aluminium should be limited to 4.5 to 12.0 wt-%, preferably to 5.0 to 8.0 wt-%, most preferably to 5.0 to 7.0 wt-%. The total content of the elements Mo and W should be limited to a maximum of up to 4.0 wt-%, preferably up to 3.0 wt-%. The content of Mn should be limited to a maximum of 1.0 wt-%, preferably up to 0.5 wt-%. The content of N will be limited to a maximum of 0.05 wt-% and should be held as low as possible.

The effects of several alloy modifications have been evaluated in terms of oxidation resistance, processability and high temperature mechanical properties. Some examples for compositions of alloys according to the present invention are presented in Table 1.

These alloys were produced by induction melting. The cast ingots were rolled to billets which subsequently were hot-rolled down to a thickness of 3 mm. Cold-rolling trials were performed.

High temperature tensile tests were performed on all alloys between 600° C–1000° C. according to the Swedish Standard SS-EN 10002-5. The Young's modulus was measured directly using strain gauges mounted on the specimen. Oxidation properties of the alloys were evaluated at 1100° C. and 1200° C. in a normal or ambient atmosphere. The samples were removed from the furnace at pre-set intervals and weighed in order to monitor the weight gain.

TABLE 1

Chemical composition

| Element | Prior Art FeCrAl | Alloy A | Alloy B | Alloy C |
|---|---|---|---|---|
| C | <0.02 | <0.02 | <0.02 | <0.02 |
| Cr | 20 | 20 | 20 | 20 |
| Ni | <0.5 | 5 | 12.5 | 5 |
| Mo + W | <0.02 | 2 | <0.02 | <0.02 |
| N | 0.007 | 0.017 | 0.014 | 0.032 |
| Al | 5.5 | 5.0 | 5.9 | 6.2 |
| REM | 0.04 | 0.025 | 0.04 | 0.08 |
| Zr + Hf | | | | 0.08 |

The large-scale microstructure of the alloys is identical to that of a Prior Art FeCrAl-alloy. However, SEM and TEM analyses show that alloys of these compositions contain nickel aluminide particles of a size of between 5 nm and 2 $\mu$m with the CsCl-type structure. The particles are evenly spaced within the ferrite grains.

The hardness of the material after hot rolling is high: in the range 400–520 HV1. By annealing, the hardness in one case could be brought down from 490 to 320 HV1. The high hardness of the material caused process disturbances, resulting in the large-scale cold rolling trials having to be postponed. No such results can thus be presented at the present time.

FIGS. 1 to 4 show the measured high temperature mechanical properties of the alloys. The Young's moduli of the experimental alloys are generally higher than that of the Prior Art FeCrAl. One interesting effect is the measured increase of Young's modulus in the two 5% Ni-alloys above 900° C.

In the temperature range below 750° C. to 800° C., the alloys according to the present invention have greater mechanical strength than the Prior Art FeCrAl-alloy. However at higher temperatures the difference between the alloys is within the experimental uncertainty of the equipment used, with one exception. The yield strength of the Alloy B is significantly higher at 900° C. and 1000° C. than that of the other alloys. The experimental alloys show consistently less elongation at fracture as shown in FIG. 1. The foil has an elongation of not more than 140% at temperatures between 600° C. and 1000° C., respectively of not more than 120% at 900° C. This effect is highest in the alloy with the highest content of Ni and in the Mo alloyed alloy.

Figure 5:
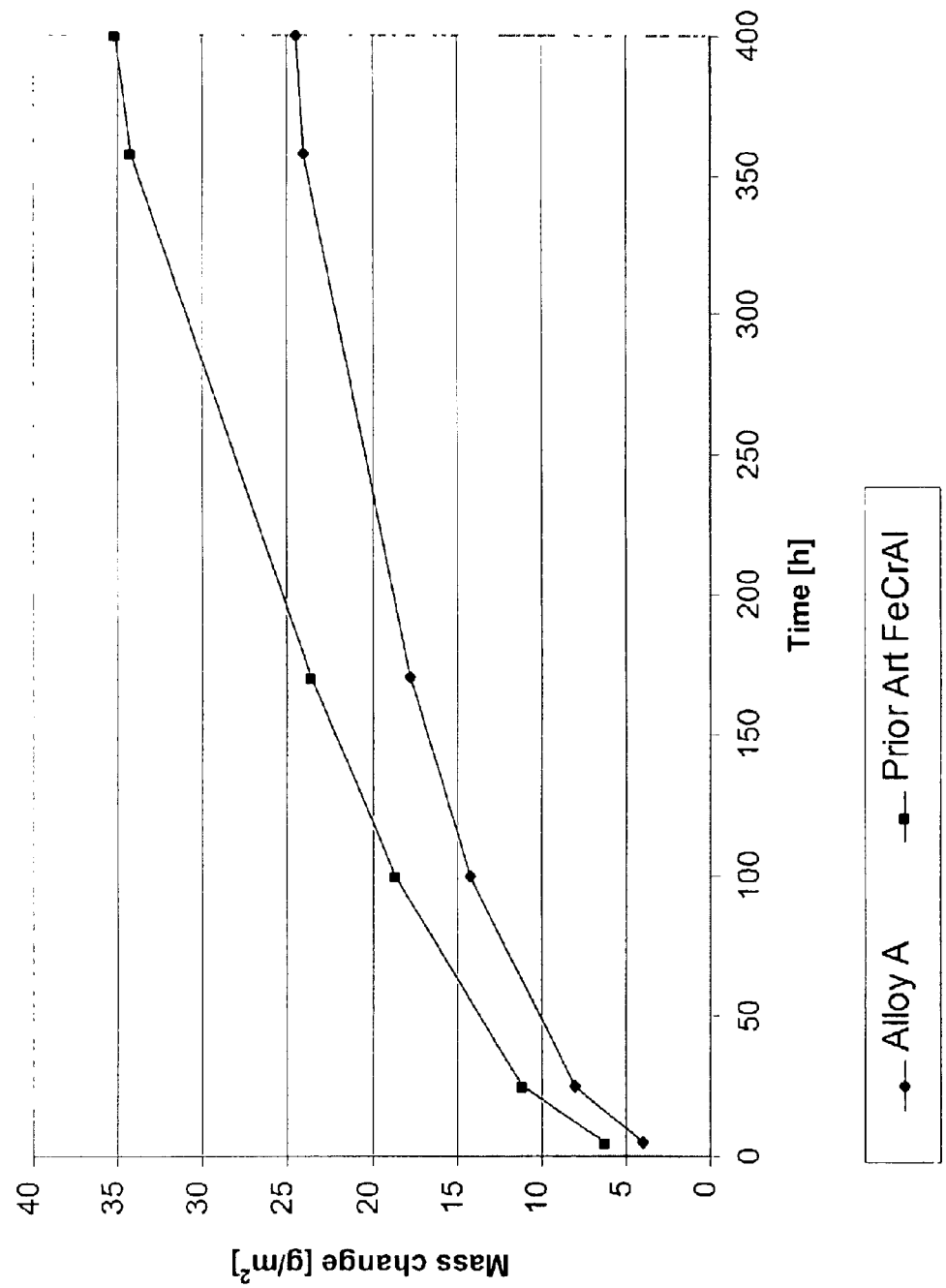
FIG. 5 shows the result of the oxidation test of an alloy of the present invention and a Prior Art FeCrAl-alloy sample by plotting the change in mass after oxidation at 1100° C. of the samples vs. time.
Figure 6:
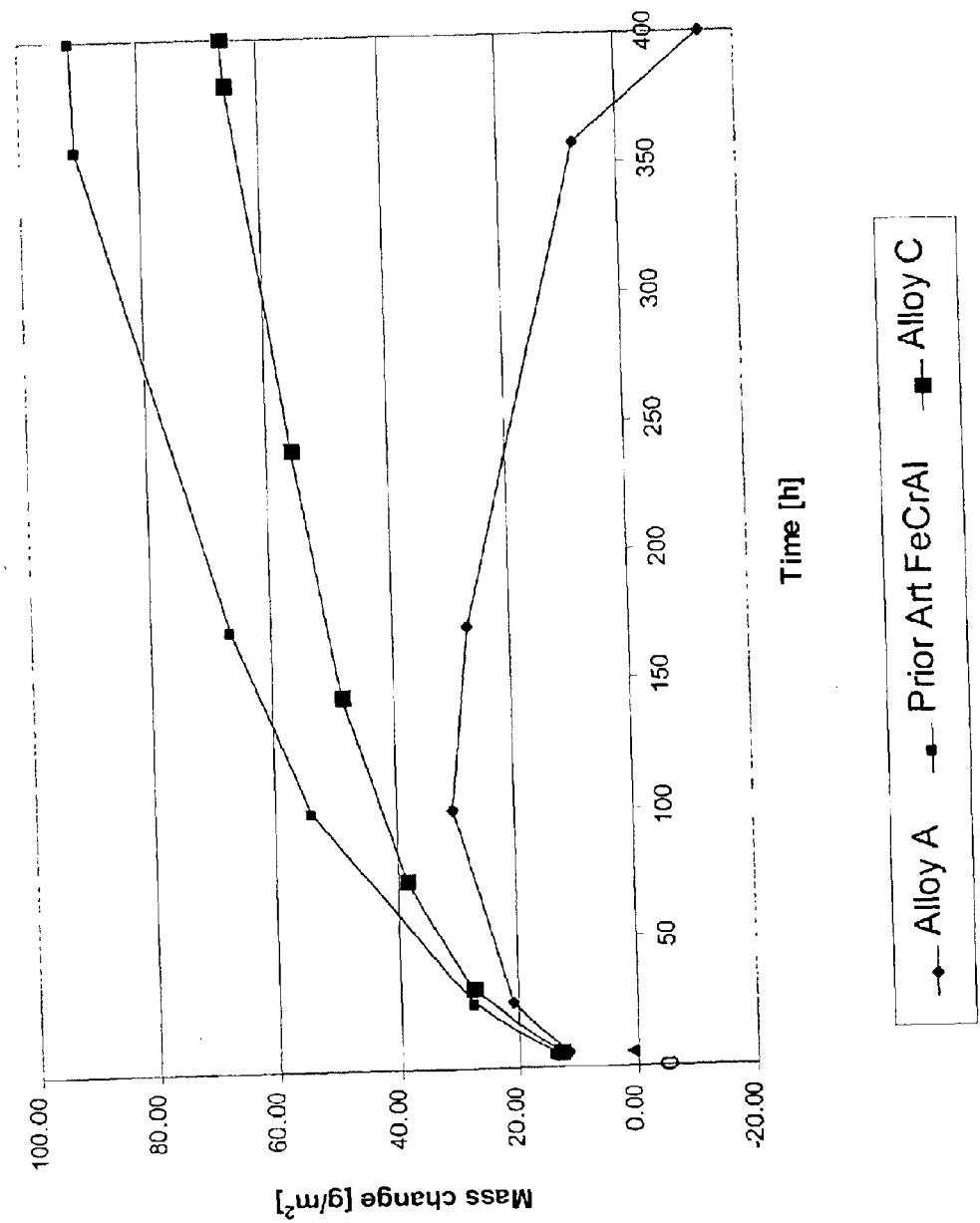
FIG. 6 shows the result of the oxidation test of alloys of the present invention and a Prior Art FeCrAl-alloy sample by plotting the change in mass after oxidation at 1200° C. of the samples vs. time.

With regard to oxidation resistance, this is shown in FIGS. 5 and 6. At 1100° C. Alloy A shows a lower weight gain than the Prior Art FeCrAl. At 1200° C., the two experimental alloys behave individually different: the Alloy C shows a normal oxidation behavior with a 30% lower total weight gain than the Prior Art FeCrAl. The Alloy A starts out with a low weight gain but starts spalling after a short initiation period. The rate of spallation is comparatively low and only starts to accelerate after 350 hours.

Figure 7:
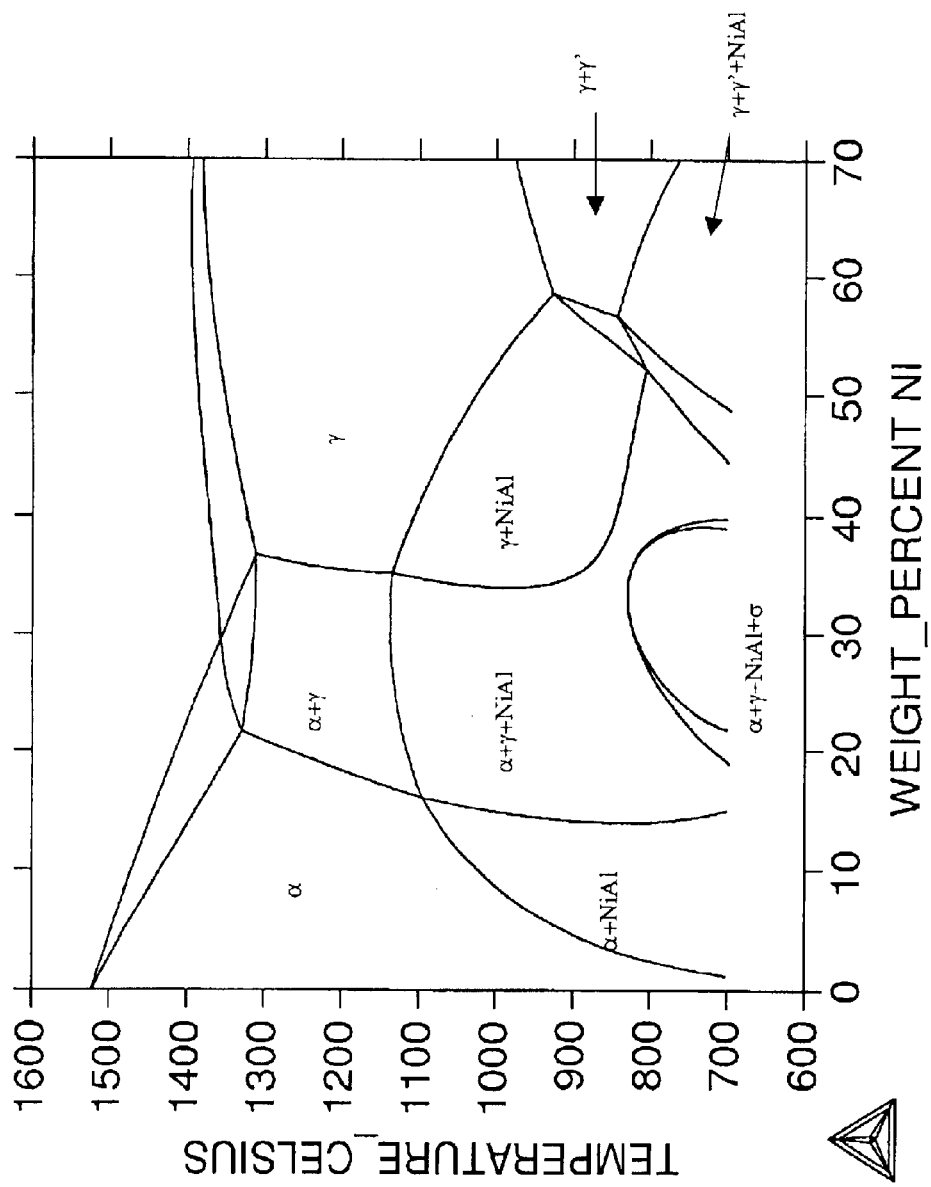
FIG. 7 shows a section through the Fe—Ni—Cr—Al Thermocalc phase diagram at 20 weight-% Cr and 5 weight-% Al.

The high hardness of the material is partially due to the presence of Ni aluminides. A calculated phase diagram section for the system Fe—Ni—20Cr—5Al is shown in FIG. 7. The phase diagram was calculated with Thermocalc. It shows that NiAl is likely to be stable even at very low Ni contents in the alloy.

The dissolution temperature of NiAl is approximately 900° C. for a 5 weight-% Ni-alloy and 1050° C. for a 12.5 weight-% Ni-alloy. No austenite is expected to form below a total Ni content of 14.0 weight-%. The lattice parameter mismatch between NiAl and ferrite in equilibrium is expected to be small, and precipitation of NiAl appears to occur coherently. The presence of NiAl in the Alloy B in the hot tensile tests above 900° C. explains the improved yield strength.

The unexpected temperature dependence of the Young's moduli between 900° and 1000° C. for two of the alloys cannot be explained at the time being, however, it may be connected with the dissolution of NiAl. The actual numbers for the Young's moduli are however still much higher than those for the Prior Art FeCrAl are. It must be noted that measurement of the Young's modulus is less accurate at high temperatures than at room temperature.

The mechanical strength is improved below 800° C. At higher temperatures the effect is less clear. The strengthening effect of Mo appears to be small above 600° C. with respect to the yield strength. In order to evaluate the usefulness of these alloys in practical applications, high temperature fatigue tests as well as creep tests will probably be necessary. However, the initial tests which have been performed and which are described in the present application, indicate that these alloys are promising candidate materials for catalytic converter bodies in mechanically challenging applications, where a combination of high mechanical strength, high temperature properties and oxidation resistance is required. The improvement of the yield strength compared with the Prior Art FeCrAl is highest at 600° C. for alloy A. Therefore, this alloy is preferred in catalytic converters working at comparatively low temperatures.

At 900° C. and above, the improvement of the yield strength is greatest for alloy B. This makes this alloy the preferred choice in catalytic converters working at high temperatures.

In an intermediate temperature range from 700 to 800° C., alloy C shows the greatest improvement in yield strength and has thus the preferred composition.

The oxidation properties of the experimental alloys are unexpectedly good, in several cases superior to that of Prior Art FeCrAl, especially referring to the high content of Ni, which was assumed to have a negative effect on the oxidation properties and resistance. In other cases, spalling is found, although the rate of spallation is not too serious for possible use of the material in applications other than catalytic converters. By adding Ni 2.5-15 weight-% and Mo+W 4 weight-% it is possible to improve the high temperature strength compared to FeCrAl catalytic converter steel, without deteriorating the oxidation resistance.

The alloy may also be useful in other high temperature applications such as heating applications, e.g.—in heat treating furnaces.

The material is extremely difficult to manufacture by conventional production due to brittleness. Thus a preferred manufacturing method is by coating an alloy with a low content of Al with pure Al and/or an aluminium-base alloy in one or more of the final steps in the production. The coating may be applied by, for example, dipping, cladding or a PVD-process.

The alloys of the present invention are basically ferritic Fe—Ni—Cr—Al alloys strengthened by the presence of minute particles of nickel aluminides and if necessary further strengthened by the presence of substitutionally dissolved elements such as Mo or W. Owing to a high Al content and the presence of reactive elements, the resistance to oxidation at high temperatures is good.

Thus, this is a suitable alloy for use as a carrier material in metallic catalytic converters, especially those that are exposed to a combination of high temperature and mechanical load.

While the present invention has been described by reference to the above-mentioned embodiments, certain modifications and variations will be evident to those of ordinary skill in the art. Therefore, the present invention is limited only by the scope and spirit of the appended claims.

What is claimed is:

1. A ferritic stainless steel alloy resistant to thermal cyclic stress and oxidation at elevated temperatures having a composition comprising, in weight %:

| | |
|---|---|
| C | ≦0.05%; |
| Cr | 16.0–24.0%; |
| Ni | 12.5–15.0%; |
| Al | 4.5–12.0%; |
| Mo + W | ≦4.0%; |
| Mn | ≦1.0%; |
| Si | ≦2.0%; |
| Zr + Hf | ≦0.1%; |
| REM | ≦0.1%; |
| N | ≦0.05%; | and
balance Fe and normally occurring steelmaking impurities and additions.

2. The ferritic stainless steel alloy according to claim 1, wherein the content of Cr is 20.0 to 22.0 wt-%.

3. The ferritic stainless steel alloy according to claim 1, wherein the content of Ni is 2.5 to 15.0 wt-%.

4. The ferritic stainless steel alloy according to claim 3, wherein the content of Ni is 5.0–12.5 wt-%.

5. The ferritic stainless steel alloy according to claim 1, wherein the content of Al is 5.0 to 8.0 wt-%.

6. The ferritic stainless steel alloy according to claim 5, wherein the content of Al is 5.0–7.0 wt-%.

7. The ferritic stainless steel alloy according to claim 1, wherein the total content of Mo and W is 3.0 wt-%.

8. A foil formed from a ferritic stainless steel alloy according to claim 1, the foil having a thickness of less than 150 μm.

9. The foil of claim 8, wherein the thickness is less than 110 μm.

10. The foil according to claim 8, wherein the foil has an elongation of not more than 140% at temperatures between 600° C. and 1000° C.

11. The foil according to claim 8, wherein the foil has an elongation of not more than 120% at 900° C.

12. A heat treating furnace comprising a component formed from the alloy of claim 1.

13. A catalytic converter comprising a component formed from the alloy of claim 1.

14. A catalytic converter comprising a component formed from the foil of claim 8.

15. A method of producing a foil of an alloy having a composition, according to claim 1, the method comprising coating a substrate material with pure aluminium and/or an aluminium-base alloy by dipping, cladding or PVD.

* * * * *